Oct. 24, 1933.                    H. A. DENMIRE                    1,931,923
                                VULCANIZING APPARATUS
                      Filed April 27, 1928           3 Sheets-Sheet 2

INVENTOR
Harold A. Denmire
BY
Evans & McCoy
ATTORNEYS

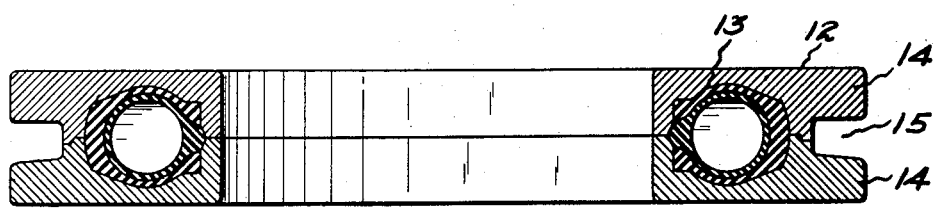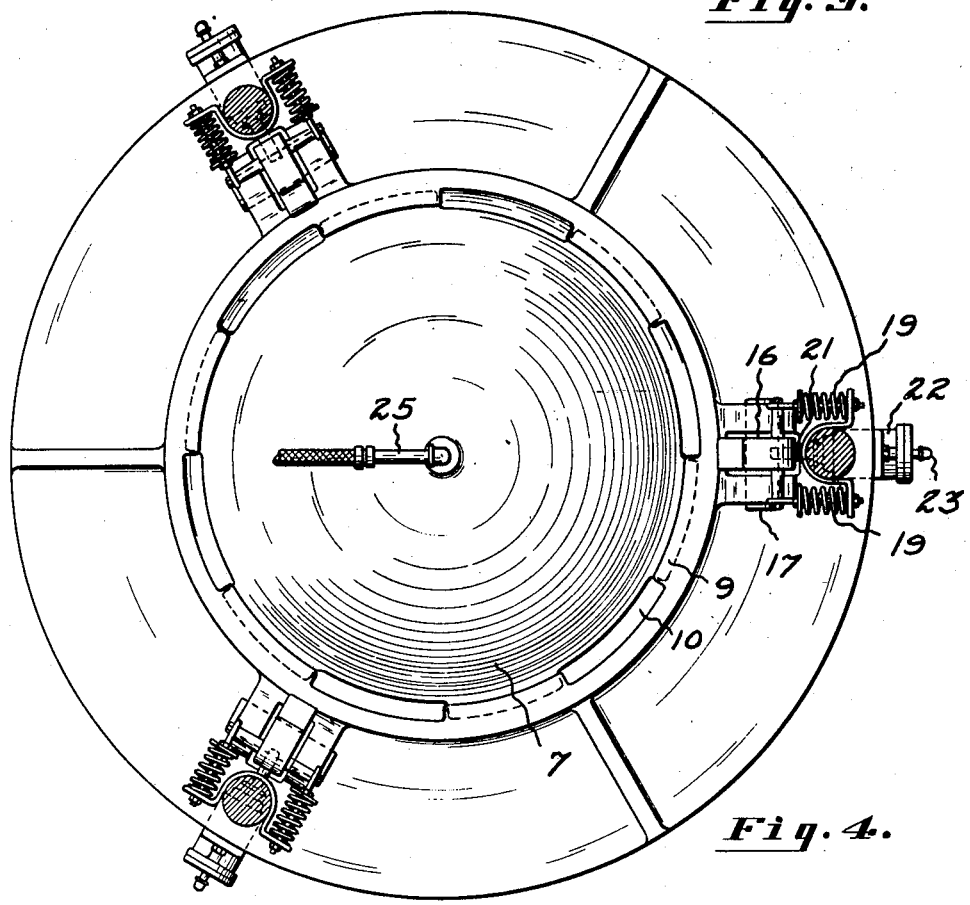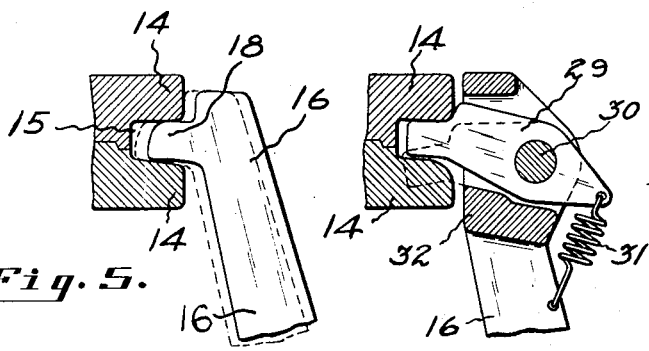

Patented Oct. 24, 1933

1,931,923

UNITED STATES PATENT OFFICE 1,931,923

VULCANIZING APPARATUS

Harold A. Denmire, Akron, Ohio, assignor to The General Tire & Rubber Company, Akron, Ohio, a corporation of Ohio Application April 27, 1928. Serial No. 273,252

4 Claims. (Cl. 18—17)

This invention relates to vulcanizing apparatus and more particularly to vulcanizing presses of the type known as pot heaters in which articles to be vulcanized are confined in a series of molds arranged in a pile within the heater, the invention being particularly useful in connection with apparatus for vulcanizing pneumatic tire casings, inner tubes, etc.

The present invention is an improvement upon the pot heater vulcanizing apparatus disclosed in my copending application Serial No. 233,597, filed Nov. 16, 1927, which has issued as Patent No. 1,744,754, granted Jan. 28, 1930 and has for its object to provide, in connection with a pot heater, simple and efficient mold handling means by which a pile of unconnected molds may be transferred from the interior of the heater to a position above the top of the heater and by which the individual molds may be successively opened for the purpose of discharging the cured articles and recharging the same with articles to be vulcanized.

A further object is to provide mold supporting means above the top of the heater casing which is engageable with the top section of any mold in the pile, so that the bottom section can be separated from the top section to permit access to the interior of the mold for discharging cured articles and replacing the same with unvulcanized articles.

A further object is to provide sectional molds of a form such that a circumferential recess is provided in each mold with which the mold supporting members above the heater may engage to support any top mold section together with the molds which are piled upon it.

With the above and other objects in view, the invention may be said to comprise vulcanizing apparatus as illustrated in the accompanying drawings hereinafter described and particularly set forth in the appended claims, together with such variations and modifications thereof as will be apparent to one skilled in the art to which the invention appertains.

Reference should be had to the accompanying drawings forming a part of this specification in which:

Fig. 3 is a transverse section through one of the tire molds.

Fig. 4 is a plan view of the vulcanizing heater.

Fig. 5 is a detail view showing the mold engaging portion of one of the mold supporting arms; and Fig. 6 is a detail view showing the modified form of supporting arm.

Referring to the accompanying drawings, the invention is shown applied to a vulcanized heater of the pot type which has a heating chamber 1, which is of the usual cylindrical form extending below the floor level. The present invention involves the provision of mold handling means in connection with a heater of this type by which the molds may be successively opened for discharging and recharging and transferred from a pile in the heater to a pile directly above the heater and spaced from the top of the heater.

Spaced above the top of the chamber 1, there is a cylindrical casing 2 which is of slightly greater diameter than the casing 1, the casing 2 being of a height sufficient to substantially enclose the entire stack of molds when they are lifted out of the heating chamber.

Figure 1:
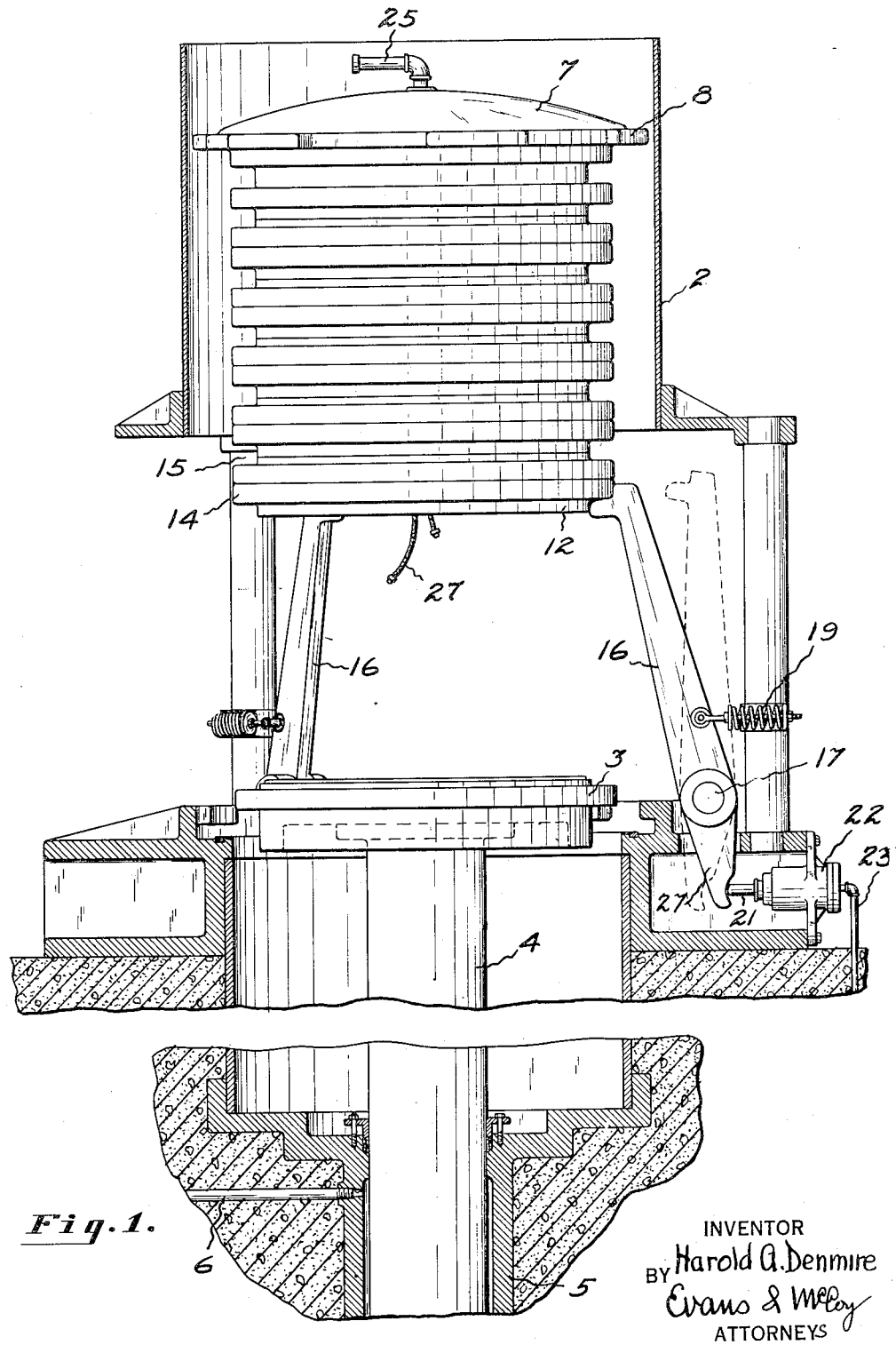
Figure 1 is a central vertical section through a vulcanizing heater showing the mold handling device of the present invention applied thereto.
Figure 2:
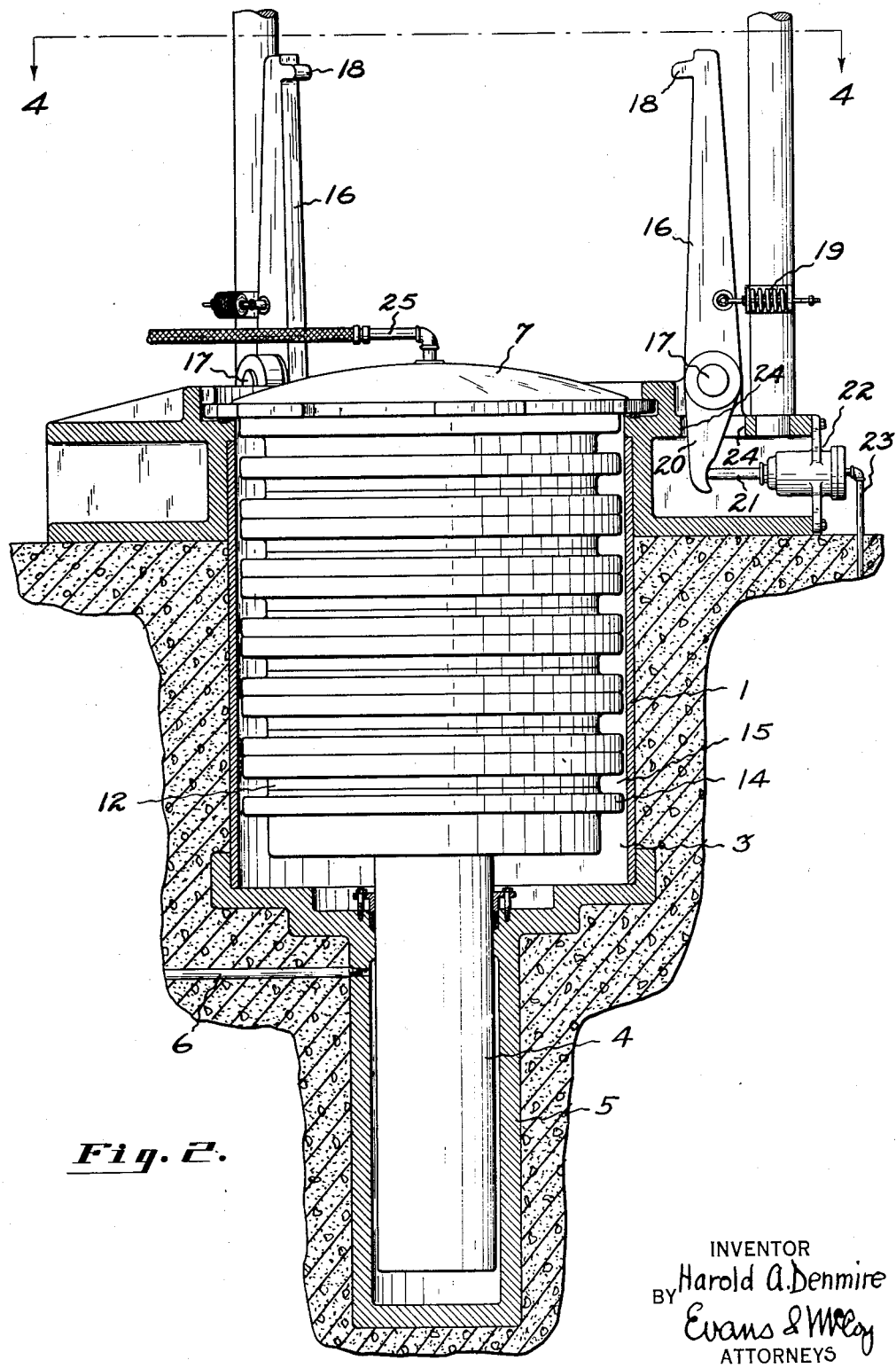
Fig. 2 is a sectional view showing the pile of molds within the heater.

In the operation of the device of the present invention, the pile of molds which are supported upon a vertically movable head 3, are transferred from the heating chamber to a position within the casing 2, the molds being transferred successively from the pile on the head 3 to the interior of the casing 2 in such a manner that the individual molds are successively opened, mold supporting means being provided in connection with the casing 2 by which the lowermost mold section of the pile supported in the casing may be positioned a sufficient distance above the uppermost mold section supported on the head 3, as shown in Fig. 1 of the drawings to permit convenient access to the lower mold section for removing the vulcanized article and replacing it with an unvulcanized article.

In order to transfer the molds from the heating chamber to the upper casing or magazine, the head 4 is mounted for movement from the bottom of the heating chamber through the open top of the heating chamber to a point adjacent the bottom of the casing 2. The head 3 is supported upon the upper end of a piston 4 which extends down into an elongated vertical cylinder 5 beneath the heating chamber and fluid under pressure is supplied to the cylinder 5 through a pipe 6 controlled by a suitable valve so that the piston may be raised or lowered as desired.

A detachable cover 7 is provided for the heating chamber 1 and this cover is provided with a flange 8 which has circumferentially spaced lugs 9 which are adapted to engage beneath correspondingly spaced lugs 10 on the heater casing. A pile of molds substantially filling the heater casing may be supported upon the head 4 and when the heater is in operation, this pile of molds is pressed against the cover 7 by fluid pressure in the cylinder 5 acting on the piston 4. Each mold is formed of two substantially identical sections, each having an annular recess 13, which conforms to one side of an article to be vulcanized. As herein shown, the molds are designed to receive pneumatic tire casings and the recesses 13 are of annular form. Each mold section has a peripheral flange 14 which is spaced from the face thereof in which the annular recess is formed, so that, when the mold sections are assembled, there is an annular recess between the flanges 14 of the top and bottom sections of the mold.

The lower face of the cover 7 is flat so that the cover 7 may rest upon the topmost mold of the pile and remain upon the top of the topmost mold section when the same is elevated into the casing 2.

A series of latch arms 16 are mounted upon horizontal pivots 17 mounted at circumferentially spaced points about the top of the casing 1, the pivot 17 being tangentially arranged so that the arms 16 may swing inwardly toward the axis of the heater. The arms 16 are normally held in a position inclined inwardly toward the axis of the heater by means of compression coil springs 19 which exert inward pressure on the arms. At their upper ends, the arms 16 have projections 18 on their inner sides which are adapted to enter the annular recess 15 of the molds to support a portion or all of the mold sections in a pile within the casing 2. The arms 16 have extensions 20 beneath the pivot 17 which are engaged by piston rods 21 extending from cylinders 22 to which fluid pressure may be supplied when desired from a pressure supply pipe 23. The piston rods 21 are radially disposed and when actuated, move the lower ends 20 of the latch arms inwardly to swing the upper ends of the arms outwardly to a position clear of the molds. The angular movement of the arms 16 is limited by means of stops 24 which engage with the extensions 20 of the arms to limit the inward and outward movement of the arms.

In the operation of the heater, after a charge of tire casings has been vulcanized, the cover 7 is released from the casing and pressure is admitted to the cylinder 5 to lift the pile of molds out of the casing. The upward movement of the mold support is continued until the topmost mold is at the level of the upper ends of the supporting arms 16, whereupon the arms 16 are released and allowed to spring into engagement with the peripheral recess 15 of the topmost mold. The supporting head 3 is then lowered, carrying with it all of the mold sections except the top section of the top mold of the pile, the downward movement of the head 3 causing the top mold to be broken open. The pile of molds on the head 3 is then lowered to a position in which the top mold section carrying the tire casing is substantially at the level of the top of the casing, whereupon the operator removes the cured tire casing and replaces it with an uncured casing. Pressure is then admitted to the cylinder 5 and the pile of molds is lifted until the topmost mold section of the pile of molds on the head 3 engages the mold section supported on the arm 16. The latch arms 16 are then released and engaged with the recesses 15 of the mold next below the top mold of the pile, whereupon the head 3 is again lowered to break open the second mold and permit the cured tire therein to be replaced with an uncured tire.

The above described operation is repeated until all of the cured tires have been removed and all of the molds have been filled with uncured tires, at which time the entire pile of molds except the lowermost mold section of the pile are supported within the casing 2 upon the latch arms 16. The arms 16 are moved to releasing position and the entire pile of molds is lowered into the heating chamber bringing the cover into position at the top of the mold, where it is locked by a turning movement which positions the lugs 9 of the cover between the lugs 10 of the casing.

In vulcanizing pneumatic tires, it is desirable to maintain fluid under pressure in air bags within the tire casings during the vulcanizing operation. To permit admission of pressure, the air bags are ordinarily provided with nipples to which short lengths of hose 27 may be attached, the short lengths of hose being connected to a common pressure supply conduit 25 which may extend within the central space provided by the pile of annular molds.

The short lengths of hose 27 are provided with quick detachable couplings so that in assembling the molds in the heater, the pressure connections can be quickly made. As shown herein, the pressure supply pipe 25 extends through the center of the cover 7 and carries the short lengths of hose 27 for attachment to the air bag valve stems.

In the mold discharging and filling operation, the head 3 is first lowered a short distance below the top section supported on the arms 16 and the hose section 27 is detached and, when the head 3 is again raised, it is stopped a short distance below the top of the arms 16 so that one of the hose sections 27 may be coupled to the air bag, whereupon the upward movement is continued.

As shown in Fig. 6 of the drawings, the latch arms 16 may be provided with mold engaging members such as indicated at 29 in this figure which will permit upward passage of the mold sections without moving the arms 16 to releasing position, the supporting members 29 of each cam being pivoted at 30 and normally held by a spring 31 in an upwardly inclined position, movement of the pivoted member being limited by a shoulder 32. Upon upward movement of the pile of molds, the finger 29 is swung upwardly and the arms 16 are forced laterally and upon downward movement of the pile of molds, the finger 29 swings into the recess 15 of the mold immediately beneath the mold previously engaged and is held in substantially horizontal position by the shoulder 32.

It will be apparent that the mold handling apparatus of the present invention eliminates the handling of the heavy molds incident to transferring them to and from the heater, enables the heater to be charged and recharged in a very small space of time by a minimum number of workmen. In addition, it will be observed that the mechanism of the present invention is exceedingly simple, reliable in operation and inexpensive for the manufacturer to install.

Furthermore, it is to be understood that the particular form of apparatus shown and described, and the particular procedure set forth, are presented for purposes of explanation and illustration and that various modifications of said apparatus and procedure can be made without departing from my invention as defined in the appended claims.

What I claim is:

1. Vulcanizing apparatus comprising a vertical heating chamber, a magazine above said chamber in vertical alinement therewith, a supporting member mounted in said chamber for movement through the top thereof, a series of molds adapted to be supported in a pile on said supporting member, each mold being composed of separable top and bottom sections formed to provide circumferential recesses between them, latch members adjacent the bottom of said magazine, means for yieldingly holding said latch members in the path of edge portions of the molds and for causing the same to enter the recesses between mold sections, and means for retracting said latches to release the molds in said magazine.

2. Vulcanizing apparatus comprising a vertical heating chamber, a mold supporting member mounted in said chamber for movement through the open top thereof, a detachable cover for said chamber, a pile of molds on said supporting member each composed of separable top and bottom sections, the top sections of the molds having marginal projections, and supporting members above the top of said chamber mounted for movement into and out of engagement with the projections of said top mold sections and adapted to support a pile of molds above the top of said chamber.

3. Vulcanizing apparatus comprising a vertical heating chamber, a detachable cover for said chamber, a supporting member mounted for movement through the open top of the chamber, a mold composed of a top and bottom section provided with complemental recesses forming an annular mold cavity, the upper of said mold sections having a peripheral flange, and latch members mounted above the top of said chamber for engagement with the flange of said upper mold section to support said upper mold section directly over said supporting member at a level above the top of said chamber.

4. Vulcanizing apparatus comprising a vertical heating chamber, a detachable cover for said chamber, a supporting member mounted for movement through the open top of the chamber, a mold composed of a top and a bottom section provided with complemental recesses forming an annular mold cavity, the upper of said mold sections having a peripheral flange, latch members mounted above the top of said chamber for engagement with the flange of said upper mold section to support said upper mold section directly over said supporting member at a level above the top of said chamber, said latches comprising arms pivoted at their lower ends adjacent the top of said chamber and having upper end portions engageable with the flange of the upper mold section, and means for yieldingly pressing said arms into the path of a mold on said supporting member.

HAROLD A. DENMIRE.